(12) United States Patent
Petersen

(10) Patent No.: US 7,397,820 B1
(45) Date of Patent: Jul. 8, 2008

(54) VOICE PACKETS IN IP NETWORK

(75) Inventor: Lars-Göran Petersen, Tumba (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 985 days.

(21) Appl. No.: 10/110,332

(22) PCT Filed: Oct. 26, 2000

(86) PCT No.: PCT/SE00/02089

§ 371 (c)(1),
(2), (4) Date: Jul. 26, 2002

(87) PCT Pub. No.: WO01/33779

PCT Pub. Date: May 10, 2001

(30) Foreign Application Priority Data

Nov. 3, 1999 (SE) .................................. 9903982

(51) Int. Cl.
*H04J 3/24* (2006.01)
(52) U.S. Cl. .................... 370/473; 370/356; 370/390; 370/466
(58) Field of Classification Search ................ 370/354, 370/230, 230.1, 235, 352–356, 389, 390, 370/395.4, 395.52, 401, 468, 469, 473, 537, 370/395.5, 466
See application file for complete search history.

(56) References Cited

U.S. PATENT DOCUMENTS

| | | | | |
|---|---|---|---|---|
| 5,598,411 A | * | 1/1997 | Matsukawa | ................. 370/352 |
| 5,623,605 A | * | 4/1997 | Keshav et al. | ............... 709/236 |
| 5,896,568 A | * | 4/1999 | Tseng et al. | ............. 455/422.1 |
| 5,905,727 A | * | 5/1999 | Christensen et al. | ..... 370/395.3 |
| 6,304,552 B1 | * | 10/2001 | Chapman et al. | ............ 370/232 |
| 6,389,038 B1 | * | 5/2002 | Goldberg et al. | ............ 370/471 |
| 6,522,667 B1 | * | 2/2003 | Oda et al. | ................... 370/474 |
| 6,640,239 B1 | * | 10/2003 | Gidwani | ..................... 709/203 |
| 6,650,650 B1 | * | 11/2003 | Schneider et al. | ........... 370/412 |

(Continued)

FOREIGN PATENT DOCUMENTS

EP    1168756 A1 *  1/2002

(Continued)

OTHER PUBLICATIONS

Grilo, A.M et al., "VTOA/VoIP/ISDN Telephony Gateway," 2nd International Conference on ATM, 1999. Jun. 21-23, 1999. pp. 230-235.*

(Continued)

*Primary Examiner*—Chi H. Pham
*Assistant Examiner*—Donald L Mills

(57) ABSTRACT

The present invention relates to a method for transportation of user information in a core network (CN). The core network is located between a source access network (SAN) and a destination access network (DANB). The method comprises the following steps: collecting in a source center (MSCa) in the source network (SAN) of voice packets from source units (1a, 2a, 3a, 4a, 5a) in the source network. The voice packets have the destination network (DANB) specified as receiving network; arranging of the collected voice packets into a payload part (IPPL) of an IP-packet (IP) in the core network (CN); transferring of the IP-packet in the core network (CN) from the source center (MSCa) to a destination center (MSCb) in the destination network (DANB).

8 Claims, 5 Drawing Sheets

U.S. PATENT DOCUMENTS

| | | | |
|---|---|---|---|
| 6,937,598 B1 * | 8/2005 | Hagirahim et al. | 370/356 |
| 7,002,993 B1 * | 2/2006 | Mohaban et al. | 370/471 |
| 7,031,338 B2 * | 4/2006 | Weaver | 370/465 |

FOREIGN PATENT DOCUMENTS

| | | | |
|---|---|---|---|
| EP | 1311085 A1 * | 5/2003 | |
| JP | 11122307 A | 4/1999 | |
| JP | 11331206 A | 11/1999 | |
| WO | PCT SE00/02089 | 3/2001 | |

OTHER PUBLICATIONS

Göran Eneroth et al., "Applying ATM/AAL2 as a Switching Technology in Third-Generation Mobile Access Networks", *IEEE Communications Magazine*, Volume, Jun. 1999, pp. 112-122.

R. Swain, "UMTS - A 21$^{st}$ Century Vision", IEE Telecommunications Conference Publication, Volume, No. 404, Mar. 1995, pp. 235-242.

* cited by examiner

VOICE PACKETS IN IP NETWORK

TECHNICAL FIELD OF THE INVENTION

The present invention relates to a signal format in an IP bearer used in a core network for transmission of user data. The invention also relates to a method and an arrangement to create said signal format.

DESCRIPTION OF RELATED ART

The use of asynchronous transfer mode networks "ATM" for transfer of information, such as video and voice, has become increasingly popular due to the high data rate and flexibility of such networks. ATM networks use a packet switching technique. An ATM network is a connection-oriented network in which each transfer of data between network devices is preceded by an order to establish a virtual connection between the devices.

In contrast, other types of networks such as internet are referred to as being connectionless because data is transferred over the network from a source device to a destination device without first establishing a connection as is required in ATM networks. In a connectionless network, data is transmitted by a source device with an address of the destination device and the connectionless network will route that data by any number of network paths to the desired destination device.

The differences in these data transfer techniques has been a major obstacle in linking a source device with a destination device via a network, where the source and destination routines generate and receive data in ATM-formatted frames and the connectionless network transmits data in Internet protocol "IP" packets. In the U.S. Pat. No. 5,623,605 such data transfer is accomplished by using encapsulators and decapsulators to encapsulate ATM-formatted frames in data portions of IP packets for transmitting on the network.

In another prior art example, a Universal Mobile Telecommunications Network UMTS architecture comprises access networks and a core network. For UMTS, ATM has been standardized as bearer for compressed voice. The Internet Protocol is used as core network. Mobiles in one access network have independent and simultaneous voice calls to mobiles in another access network. The two access networks are connected to the IP core network and compressed voice packets are issued e.g. every 10 ms. The IP-based core network provides connectionless end-to-end service by means of routing in each traversed node. The IP format comprises a header and a payload and comes in two versions, namely IPv4, well known and established on the market today, and Ipv6, newly developed and beginning to be introduced on the market. An Ipv4 packet will have a header of 28 octets and an Ipv6 packet will have a combined header of 52 octets. When the IP-based core network issues an IP packet for every voice packet regularly every 10 ms, the header-payload ratio between the average voice packet of 6 octets in the payload will become very unbalanced. For IPv4 the figures are 28 to 6. For Ipv6 the figures are 52 to 6. This unbalanced ratio will lead to bandwidth waste.

SUMMARY OF THE INVENTION

The present invention solves the problem with unbalanced ratio between header and payload in an IP packet when information is transferred between access networks of ATM-type, via a core network of IP-type.

The problem is solved by the invention by arranging multiple voice packets, having the same destination address, in the payload part of the IP packet.

In a method according to the invention, voice packets from an ATM voice bearer, having the same access destination network addresses, are gathered in an access source network and arranged into the payload part of an IP bearer in a core network. The IP bearer transports the packets to the destination access network address. In the access destination network, packets are distributed to their final destination within the access destination network.

More in detail, the IP signal format includes:
a header, comprising routing information.
a payload, comprising voice information.

The voice information includes multiple voice packets with the same destination address. The voice packets are arranged into the payload part from an ATM voice packet bearer.

One object of the present invention is to increase the bandwidth when transmitting voice packets in an IP core network between two access networks of ATM-type.

Another object is to enhance the overall voice quality by leaving voice packets untouched from source to destination access networks, even though a core network of different type has to be passed.

An advantage with the invention is the bandwidth saving that can be made in the core network.

Another advantage is that the packet format used in the source and destination access networks can be kept during the transport in the core network.

DESCRIPTION OF PREFERRED EMBODIMENTS

Figure 1:
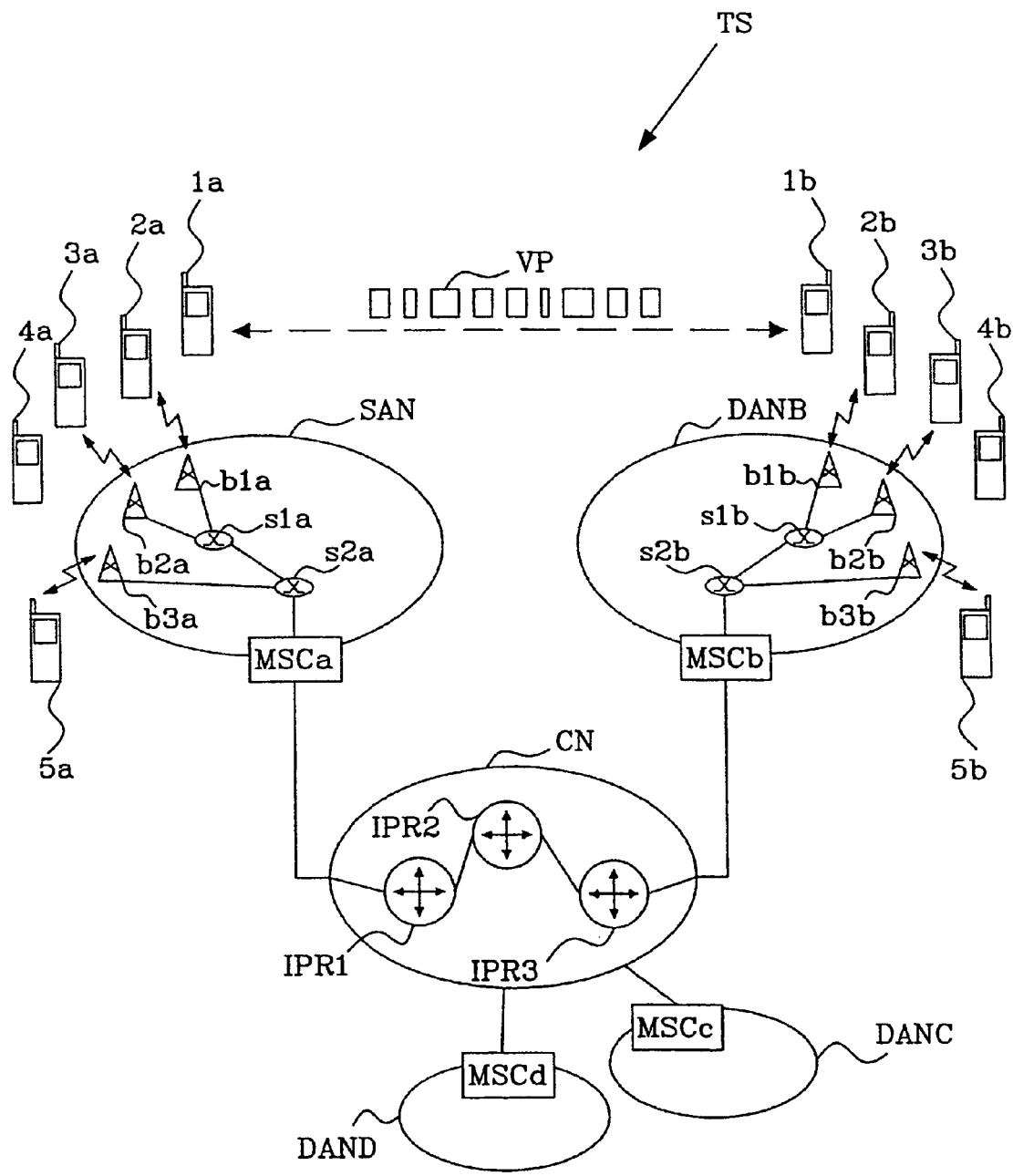
FIG. 1 is a perspective illustration of a telecommunication system having a source access network of ATM-type, a core network of IP-type and a destination access network of ATM-type.

FIG. 1 discloses a telecommunication system TS used for mobile communication. The telecommunication system includes a source access network SAN and a destination access network DANB, both of ATM-type (Asynchronous Transfer Mode). The telecommunication system comprises a core network CN of IP-type (Internet Protocol). The core network CN is used for transportation of user data such as voice packets VP between the source and the destination access networks SAN and DANB. The source access network SAN in FIG. 1 includes base transceiver stations b1a, b2a and b3a communicating with mobile stations 1a, 2a, 3a, 4a and 5a. The communication between the base stations and the mobile stations constitute the radio interface. The radio interface in this embodiment is based on WCDMA (Wideband Code Division Multiple Access).

The ATM-networks SAN and DANB are connection-oriented networks in which each transfer of data between network devices is preceded by an order to establish a virtual connection between the devices. The ATM networks in FIG. 1 are AAL2/ATM based access networks. AAL2 (Adaption Layer 2) specifies ATM transport of connection-oriented circuit and high bit-rate packetized audio and video. The communication protocols in an ATM network are designed in a layered fashion with lower layer protocols providing services to the next higher layer. The physical layer is the lowest layer protocol, which provides access to the transmission medium, specifying details concerning physical interface signalling and timing. Data link layer protocols allow communication with the physical layer and provide link-by-link error detection/correction. Network layer protocols then take over by providing end-to-end addressing, flow control and integrity checking. The transport layer provides multiplexing onto the network. The session layer establishes a connection between systems. Finally, the presentation layer manipulates data into different forms for the highest layer, the application layer.

The base stations b1a, b2a and b3a in the source access network SAN are connected to ATM/AAL2 switches S1a and S2a. The first and second base station b1a and b2a are connected to a first switch s1a. The first switch s1a and the third base station b3a are both connected to a second switch s2a. The switches direct voice packets through the access network via the established virtual connection. The second switch s2a is connected to a mobile switching centre MSCa in the source access network SAN. The mobile switching centre MSCa acts as a gateway to the IP-based core network CN.

The destination access network DANB has the same configuration as the source access network SAN previously mentioned. The mobile stations 1b, 2b, 3b, 4b and 5b communicate with base stations b1b, b2b, and b3b via a WCDMA radio interface. The base stations in the destination access network DANB are connected to ATM/AAL2 switches S1b and S2b in the same manner as in the source access network SAN. The second switch in the destination access network is connected to a mobile switching centre MSCb which acts as a gateway to the IP-based core network CN.

The IP-based core network CN is connectionless. In a connectionless network, data is transmitted by a source device, which in this case is the source centre MSCa in SAN. An IP data header comprises a destination device address i.e. the address to the destination centre MSCb in DANB. The connectionless network will re-route the data by any number of network paths to the desired destination device. The re-routing takes place in IP-routers IPR1-IPR3. The IP-routers verify an address specified in the header in a received IP-packet and re-route the packet to the correct destination. In FIG. 1 is shown a general outline how voice packets VP are transported from the first base station b1a in the source access network SAN to the first base station b1b in the destination network DANB via the IP routers IP1-IP3.

Figure 2A:
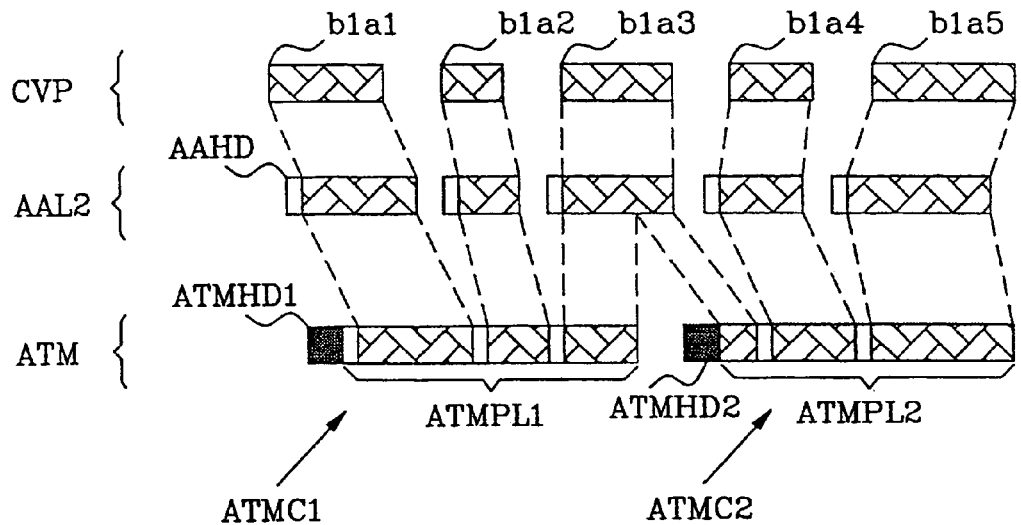
FIG. 2a discloses an ATM signal format including ATM cells with a header part and a payload part.

The building up of ATM cells in the ATM access networks can be seen in FIG. 2a. The figure shows the basics of AAL2 packets multiplexed on ATM. ATM is connection oriented to its nature meaning that a connection must be established before any cell can be traversed. In the following example a connection in the source access network SAN is established between the first base station b1a and the mobile switching centre MSCa. Compressed voice packets b1a1-b1a5 from mobile stations communicating with the first base station b1a is shown in FIG. 2. In the ATM adaptation layer AAL2, each voice packet b1a1-b1a5 is provided with a header AAHD in which the destination address is specified. Only one header is shown in FIG. 2a. Voice packet and header together constitute an AAL2 packet. Before transportation in the ATM source access network SAN, an ATM cell is created. In FIG. 2a, two ATM cells are shown. The ATM cells have a similar design as an AAL2 packet, with a header part ATMHD1 and ATMHD2 and a payload part ATMPL1 and ATMPL2, but unlike the AAL2 packet, the ATM cell has a fixed payload size. The payload size of an ATM cell is 48 octets, while the payload size in an AAL2 packet can vary from 1 to 64 octets. In the example in FIG. 2a, the first two voice packets b1a1 and b1a2 are arranged in its entirety into the payload part ATMPL1 of a first ATM cell ATMC1. A third voice packet b1a3 is partly arranged into the payload ATMPL1 of the first ATM cell ATMC1. The remaining part of the third voice packet b1a3 is arranged into the payload part ATMPL2 of a second ATM cell ATMC2. The voice packet b1a3 thereby overlaps the first ATM cell boundary and continue with the remainder in the next ATM cell ATMC2. After establishment of a connection, the ATM cell is transported through the source access network SAN from the first base station b1a to the mobile switching centre MSCa.

Figure 3:
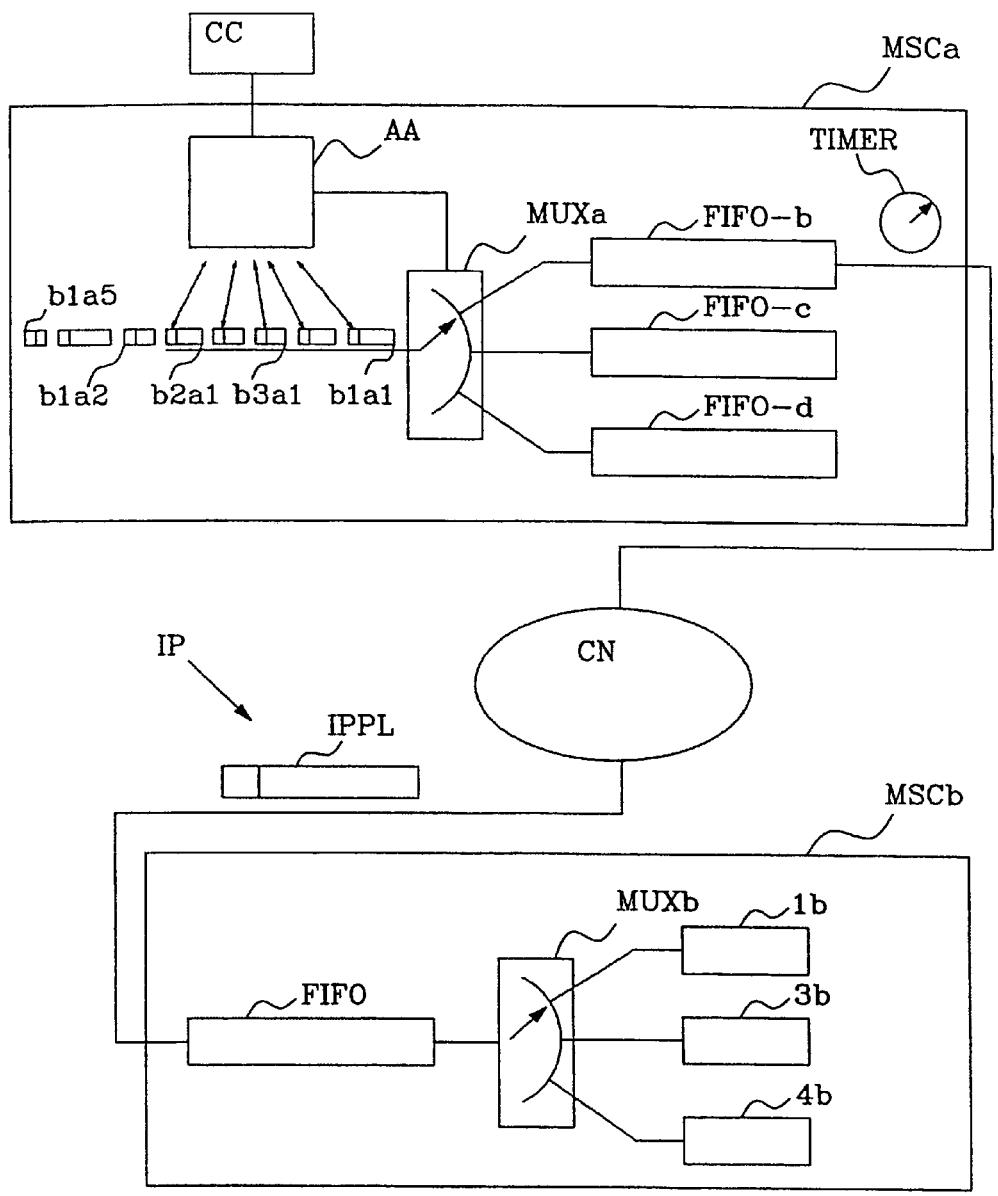
FIG. 3 is a block schematic illustration of a source and a destination centre, communicating via a core network CN.

FIG. 3 discloses a block schematic illustration of the source centre MSCa communicating with the destination centre MSCb via the core network CN. The source centre MSCa comprises a multiplexer MUXa having outputs connected to "First In First Out" registers FIFO-b, FIFO-c and FIFO-d. Data sent to a first register FIFO-b belong to the destination centre MSCb, while data to the other two registers FIFO-c and FIFO-d belong to other destination centres which so far have not been discussed. Voice packets b1a1, b3a1, b2a1, b1a2 and b1a5 received from source units are received to the multiplexer MUXa and distributed to the registers FIFO-a, FOFO-b or FIFO-c in the source centre MSCa. Sending of control information from the source network to the destination network, via an established control channel precedes connection establishment. A call centre CC in the source network SAN analyses requested set-up of calls and distributes call set-up data to an address analyser AA in the source centre MSCa. The address analyser AA is informed by the call centre CC of the specified destination for received voice packets. The address analyser is connected to the multiplexer MUXa and directs after connection establishment voice packets to the correct register FIFO-b, FIFO-c and FIFO-d. The transportation of the voice packets from the source network SAN to the destination network DANB takes place over an IP core network CN in the payload part IPPL in an IP packet IP.

The destination centre MSCb is located in the destination network DANB and comprises a First-In-First-Out register FIFO to which voice packets from the first register FIFO-b is received. The register FIFO in the destination centre MSCb is connected to an input of a multiplexer MUXb in the centre. The multiplexer distribute voice packets to addressed destination units 1b, 3b, 4b located in the destination network DANB. Voice packets in the payload part of one or more IP-packets with the same base station as destination, are arranged into an ATM cell in the destination network DANB. After establishment of a virtual connection in DANB specified in the voice packet header, the ATM cell is transported to the correct destination base station and voice packets are distributed to specified destination units.

Figure 2B:
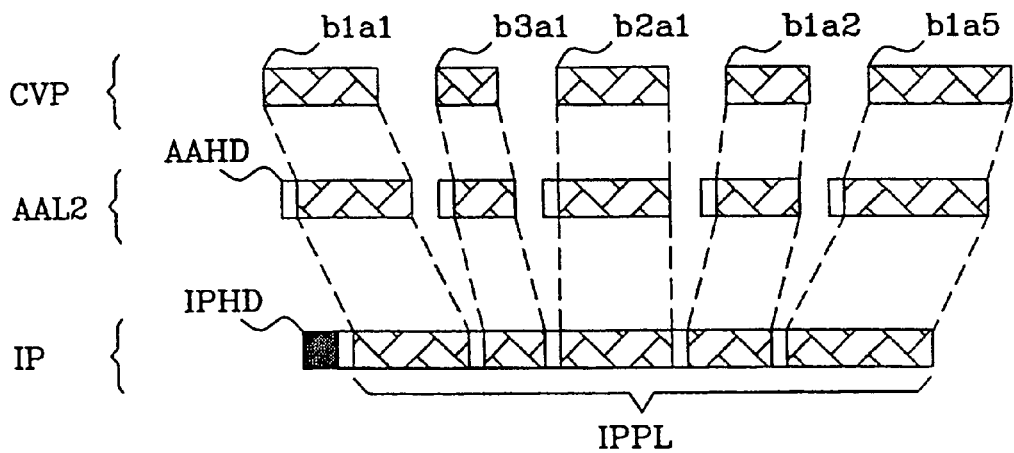
FIG. 2b discloses an IP signal format including a header part and a payload part.

According to the invention, voice packets with the same destination address, i.e. having the same access network as destination, are gathered in the mobile switching centre MSCa and transferred to the payload part of an IP packet after a specified time period. In FIG. 2b, the building up of an IP packet is shown. Compressed voice packets gathered in the mobile switching centre MSCa are transferred to the payload part IPPL of the IP packet IP. In FIG. 2b can be seen how the voice packets have been arranged in the IP packet. The voice packets having the same destination address, i.e. which all belong to the destination access network DANB, have been arranged in the payload part of the IP packet. The voice packets b1a1, b1a2 and b1a5 arrive from the first base station, b3a1 from the third base station and b2a1 from the second base station.

Figure 4:
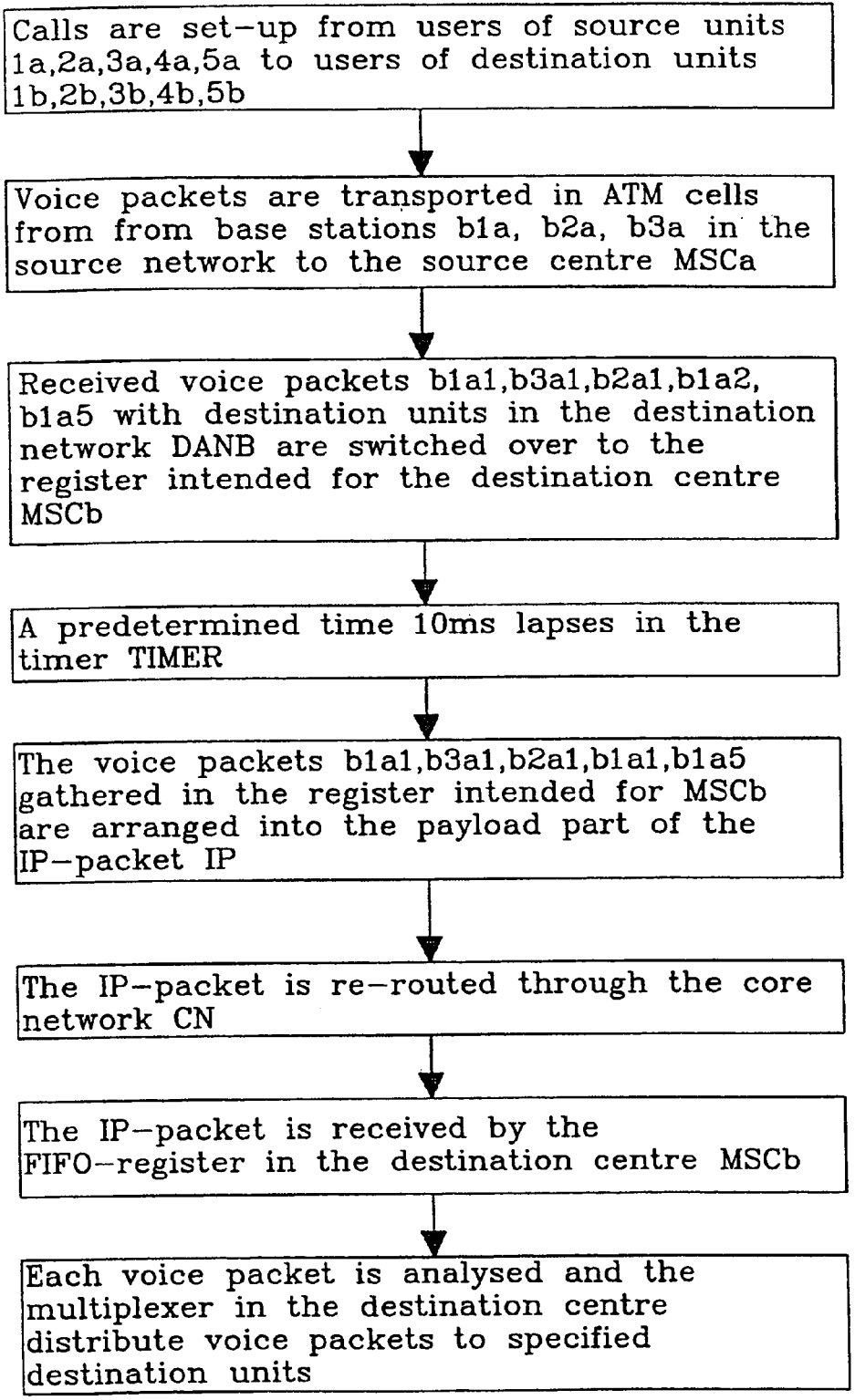
FIG. 4 is a flow sheet illustrating a method to create the IP signal format.

A method according to the invention will now be described more in detail. The telecommunication system used in the method is the system already shown in FIG. 1 and FIG. 3. References that already have been used in previous figures will also be used in the explanation of the method. The most essential steps of the method can be seen in FIG. 4. The method comprises the following step:

- A call is set-up from a user of the source unit 1a in the source network SAN to a user of destination unit 1b in the destination network DANB
- The call set-up is analysed by the centre CC. The call centre send information to the address analyser AA in the source centre MSCa that voice packets received in the source centre from source unit 1a is to be sent to the destination centre MSCb in the destination network DANB.
- A first voice packet b1a1 is sent over the air interface from the source unit 1a to the base station b1a in the source network SAN.
- The voice packet b1a1 is transported from the base station b1a to the source centre MSCa in a payload part of an ATM cell. The ATM cell is transported through the ATM source access network SAN, via the switches S1a and S2a.
- A voice packet b3a1 with destination unit 2b is transported from the base station b3 to the source centre MSCa in an ATM cell. A voice packet b2a1 with destination unit 3b is transported from the base station b2 to the source centre MSCa in an ATM cell. Two voice packets b1a2 and b1a5 with destination units 4b and 5b are transported from base station b1 to the source centre MSCa in one ATM cell. All voice packets are handled in the same manner as the previously mentioned first voice packet b1a1.
- The voice packets b1a1, b3a1, b2a1, b1a2 and b1a5 are received from the base stations b1, b2, b3 by the source centre MSCa.
- The address parts in the received voice packets are analysed by the address analyser AA. By checking the address of the voice packet b1a1 and use the information already received from the call centre CC, the address analyser AA influence the multiplexer in the source unit to switch over and transmit the received voice packet b1a1 to the first register FIFO-b.
- All received voice packets b1a1, b3a1, b2a1, b1a1 and b1a5 having the destination units in the destination network DANB specified as receiving units will be switched over by the multiplexer MUXa to the register FIFO-b intended for the destination centre MSCb.
- A predetermined time 10 ms lapses in the timer TIMER.
- The voice packets b1a1, b3a1, b2a1, b1a1 and b1a5 gathered in the first register FIFO-b are arranged into the payload part IPPL of the IP-packet IP.
- The IP-packet is re-routed from the source centre MSCa to the destination centre MSCb through the core network CN, via the IP-routers IPR1, IPR2 and IPR3.
- The IP-packet is received by the First-In-First-Out register FIFO in the destination centre MSCb.
- Each voice packet is analysed and the multiplexer MUXb in the destination centre MSCb is arranged to distribute the received voice packet to the specified destination units 1b,2b,3b,4b,5b.

Figure 5:
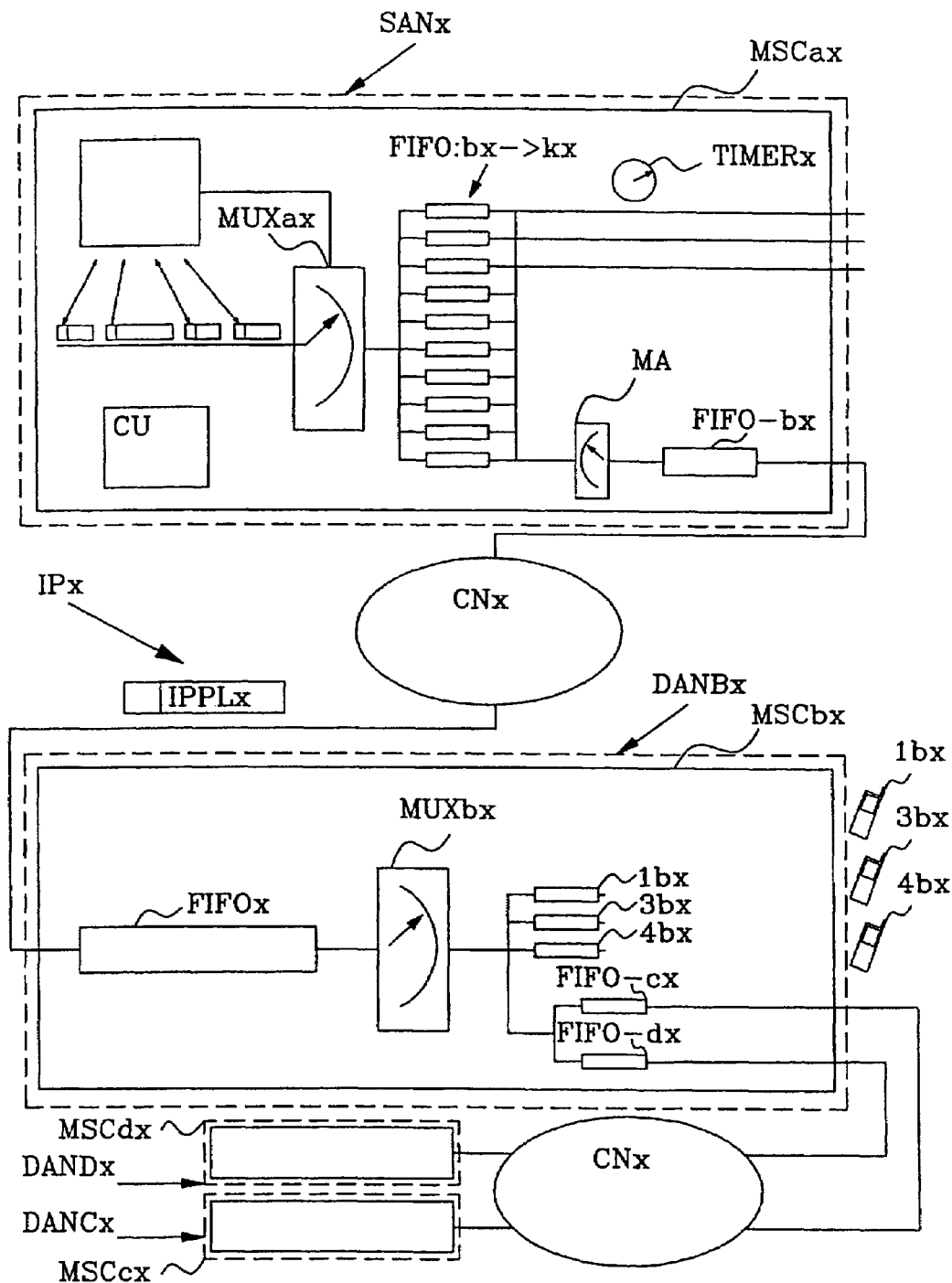
FIG. 5 is a block schematic illustration of a telecommunication system having a source access network of ATM-type, a core network of IP-type and several destinations access networks of ATM-type.

In a second embodiment, the telecommunication system TS includes several destination networks (DANBx, DANCx and DANDx). The destination networks are disclosed in FIG. 5 and represented by the destination centres MSCbx, MSCcx and MSCdx. According to the invention, the embodiment which now will be explained is used when the number of AAL2 packets to be sent to one access network are too few to constitute a cost efficient transfer in the payload part of an IP-packet. FIG. 5 discloses a block schematic illustration of a source centre MCSax communicating with destination centres MSCbx, MSCcx and MSCdx via a core network CNx. The receiving input of a multiplexer receives voice packets from units in the source access network. The inputs of First-In-First-Out registers FIFO:bx-FIFO:kx are connected to an output of the multiplexer MUXax. The received voice packets in this embodiment have different destination centres MSCbx, MSCcx and MSCdx specified as receivers. In the same manner as discussed in FIG. 3, voice packets belonging to the destination centre MSCb are multiplexed into a First-In-First-Out-register FIFO:bx. In the same way, voice packets belonging to the destination centre MSCc is multiplexed into a First-In-First-Out-register FIFO:cx and voice packets belonging to MSCd is multiplexed into FIFO:dx. In this second embodiment, a control unit CU selects which registers FIFO:bx-kx contain only a small number of voice packets after the lapse of a timer TIMERx. The number of voice packets, representing a small number could be an interval, for example 1-10. The voice packets in the selected FIFO-registers, in this embodiment the registers FIFO:bx, FIFO:cx and FIFO:dx, are all multiplexed into a register FIFO-bx located within MSCa but belonging to MSCb. The reason that FIFO:bx-FIFO:dx have been selected is that the registers together have a number of voice packets suitable to transfer in the payload part of an IP-packet IP. The reason that MSCb has been selected to be the receiving centre for the IP-packet, which also contains voice packets to MSCc and MSCd, is that the voice packets to MSCb outnumber the number of voice packets to MSCc and MSCd. The voice packets gathered in the FIFO-register FIFO-bx, are re-arranged to the payload part of the IP-packet. The IP-packet is routed in the core network CNX to the centre MSCb in the destination access network DANBx. The destination centre MSCbx comprises a First-In-First-Out register FIFOx to which voice packets from the register FIFO-bx is received. The register FIFOx in the destination centre MSCb is connected to an input of a multiplexer MUXbx in the centre MSCBX. The multiplexer distributes voice packets to addressed units 1bx, 3bx and 4bx within the destination network DANBx. The voice packets that do not belong to units located within the network, i.e. voice packets that belong to the other two destination networks DANCx and DANDx are distributed via multiplexer to the FIFO-registers that transfer information to MSCcx and MSCdx via the core network CNx. In FIG. 5, the same core network CNx is disclosed twice. Voice packets sent to MSCcx and MSCdx are distributed to receiving units within respective network DANCx and DANDx. This second embodiment presumes some kind of organiser that keeps track of the sequence in which voice packets are sent from the source network. This can be done by, for example, adding information to the AAL2 header.

As a variant of this second embodiment, instead of first selecting which registers FIFO:bx-kx contain only a small number of voice packets, voice packets from different chosen FIFO-registers are always sent together. Different destination networks are combined in clusters and voice packets in FIFO-registers belonging to a cluster is always put together and sent in one IP-packet to one of the destination networks in the cluster, i.e. a selected destination network, a so called master network. After arrival to the selected destination network, the voice packets belonging to other networks are further distributed to the other networks in the cluster. Instead of always in one IP-packet send voice packets belonging to clusters, as a further variant, change over is done between that method and a method where transportation from one source network to one destination network takes place in an IP-packet that carries only voice packets intended for that destination network. If the number of IP-connections between the source network and the destination network is less than, for example, five, transition is done to the transportation to cluster method. The number of single IP-connections from a source to a destination network thereby decides whether or not it is cost efficient to continue.

In a third embodiment not shown in any of the figures, an AAL2-router is located in the core network and connected to one of the routers in the core network CNx. In the previously discussed second embodiment, voice packets in the source centre MSCa were moved from FIFO-registers containing a low number of voice packets to the register FIFO-bx. In this third embodiment, voice packets from FIFO-registers having a low number of voice packets are moved to the AAL2-router. In the AAL2-router in the core network, the received voice packets are distributed to the source centres MSCbx, MSCcx and MSCdx to which the voice packets belong. Like in the second embodiment, this embodiment contributes to a more cost efficient transfer of voice packets within the core network. By using the above described methods, the ratio between the header part and the payload part in the IP-packets become more balanced.

Different variations are of course possible within the scope of the invention. Any type of IP-packet i.e. all variants of IP packets, are possible to use in the invention. The discussed core network of IP-type can be situated between two base stations, i.e. the source and destination access networks in such embodiment are two radio interfaces including base stations and mobile units. AAL2 packets have been used as examples of packets to transport in the core network between access networks. It is also possible to use variants of AAL2 packets in the payload of the IP packet. These variants can be created by reducing the AAL2 packet header to just two octets. Removing the header Error Control and reducing the user to user indication can for example do this. In other words, the invention is not restricted to the above described and illustrated exemplifying embodiments, and modifications can be made within the scope of the claims.

The invention claimed is:

1. A method of transporting voice packets in a core network from a source access network to first and second destination access networks, said method comprising the steps of:

collecting in a source center in the source network, a plurality of voice packets from multiple source units in the source network, wherein a first portion of the voice packets are addressed to a destination in the first destination network, and a second portion of the voice packets are addressed to a destination in the second destination network;

loading the collected voice packets into a payload part of an IP-packet in the core network without changing a protocol format of the voice packets;

transferring the IP-packet in the core network from the source center to a destination center in the first destination network;

unloading the voice packets from the IP-packet by the destination center;

delivering by the destination center, the first portion of voice packets utilizing the protocol format of the voice packets;

loading the second portion of voice packets into a second IP-packet; and forwarding the second IP-packet in the core network from the first destination network to the second destination network.

2. The method according to claim 1, further comprising the steps of:

regulating the number of the collected voice packets utilizing a predetermined time period; and multiplexing the collected voice packets into a single source unit for the loading of the collected voice packets into the payload part of an IP-packet.

3. The method according to claim 1, wherein the voice packets are addressed to a plurality of destinations in the first and second destination networks, and the step of delivering the first portion of voice packets by the destination center includes delivering each voice packet in the first portion of voice packets to its respective destination in the first destination network.

4. A system for transporting voice packets in a core network from a source access network to first and second destination access networks, said system comprising:

means for collecting in a source center in the source network, a plurality of voice packets from multiple source units in the source network, wherein a first portion of the voice packets are addressed to at least one destination in the first destination network, and a second portion of the voice packets are addressed to at least one destination in the second destination network;

means for loading the collected voice packets into a payload part of an IP-packet in the core network without changing a protocol format of the voice packets;

means for transferring the IP-packet in the core network from the source center to a destination center in the first destination network;

means in the destination center for unloading the voice packets from the IP-packet;

means in the destination center for delivering the first portion of voice packets to the at least one destination in the first destination network utilizing the protocol format of the voice packets;

means for loading the second portion of voice packets into a second IP-packet; and means for forwarding the second IP-packet in the core network from the first destination network to the second destination network.

5. The system according to claim 4, further comprising:

a timer in the source centre regulating the number of the collected voice packets; and a multiplexer for multiplexing the collected voice packets into a single source unit for loading the collected voice packets into the payload part of an IP-packet.

6. The system according to claim 4, wherein the voice packets are addressed to a plurality of destinations in the first and second destination networks, and the means in the destination center for delivering the first portion of voice packets includes means for delivering each voice packet in the first portion of voice packets to its respective destination in the first destination network.

7. A network node in a first destination network for transporting voice packets, said network node comprising:
- means for receiving from a core network, an IP packet in which a plurality of voice packets from multiple source units are loaded, wherein a first portion of the voice packets are addressed to at least one destination in the first destination network, and a second portion of the voice packets are addressed to at least one destination in a second destination network;
- means for unloading the voice packets from the IP-packet;
- means for delivering the first portion of voice packets to the at least one destination in the first destination network utilizing a protocol format of the voice packets;
- means for loading the second portion of voice packets into a second IP-packet; and
- means for forwarding the second IP-packet in the core network to the second destination network.

8. The network node according to claim 7, wherein the voice packets are addressed to a plurality of destinations in the first and second destination networks, and the means for delivering the first portion of voice packets includes means for delivering each voice packet in the first portion of voice packets to its respective destination in the first destination network.

* * * * *